(12) United States Patent
Clean et al.

(10) Patent No.: US 6,453,798 B2
(45) Date of Patent: Sep. 24, 2002

(54) BEVERAGE BREWING APPARATUS HAVING AUTOMATIC AND SEMI-AUTOMATIC BREWING MODES

(75) Inventors: Stan M Clean, Dorval; Denis Gravel, Brossard; Robert Declos, St-Hyacinthe, all of (CA)

(73) Assignee: VKI Technologies Inc., St Hubert (CA)

( * ) Notice: Subject to any disclaimer, the term of this patent is extended or adjusted under 35 U.S.C. 154(b) by 0 days.

(21) Appl. No.: 09/801,759

(22) Filed: Mar. 9, 2001

(30) Foreign Application Priority Data

Mar. 10, 2000 (CA) .............................................. 2300446

(51) Int. Cl.[7] .............................................. A47J 31/40
(52) U.S. Cl. ...................................... 99/280; 99/289 R
(58) Field of Search ......................... 99/279, 280, 281, 99/282, 283, 284, 239 R, 239 T (56) References Cited

U.S. PATENT DOCUMENTS

| 3,565,641 | A |   | 2/1971  | King ......................... 99/289 R |
|-----------|---|---|---------|------------------------------------------|
| 4,608,916 | A |   | 9/1986  | Becker et al. ................ 99/283    |
| 4,784,050 | A |   | 11/1988 | Cavalli ...................... 99/289 R  |
| 5,001,969 | A | * | 3/1991  | Moore et al. ................. 99/282    |
| 5,134,924 | A |   | 8/1992  | Vicker ........................ 99/280   |
| 5,197,373 | A | * | 3/1993  | DeJong ....................... 99/283    |
| 5,255,593 | A | * | 10/1993 | Bunn et al. ................... 99/280   |
| 5,813,318 | A | * | 9/1998  | Zanin et al. .................. 99/291   |

FOREIGN PATENT DOCUMENTS

EP          1 040 780          3/2000

* cited by examiner

Primary Examiner—Reginald L. Alexander
(74) Attorney, Agent, or Firm—Ronald S. Kosie; Robert Brouillette (57) ABSTRACT

A beverage brewing apparatus having an automatic brew cycle mode and a semi-automatic brew cycle mode.

4 Claims, 13 Drawing Sheets

BEVERAGE BREWING APPARATUS HAVING AUTOMATIC AND SEMI-AUTOMATIC BREWING MODES

The present invention relates to an apparatus for brewing a beverage from an aqueous medium (e.g. hot water) and a particulate (e.g. ground) beverage material such as for example ground coffee. The invention in particular is related to an apparatus able to brew coffee using a semi-automatic brewing cycle. Although the text which follows will make specific reference coffee brewing machines the invention is applicable to the brewing of other beverage (e.g. tea).

Automatic coffee brewing machines are known. U.S. Pat. No. 3,565,641, for example, teaches a piston based automatic coffee brewing machine. The entire contents of this United States patent is hereby incorporated by reference.

Known automatic coffee brewing machines have the draw back that the coffee provided by the machine is limited to the type or types of coffee which is associated with the machine. In other words, a user of the automatic machine is restricted with respect to the choice of coffee, i.e. the user is not able to operate the machine with his own choice of coffee which is different from that offered by the machine.

It would be advantageous to have a beverage brewing apparatus which would allow a user to brew a beverage (e.g. coffee) which is different from that provided in the beverage machine.

The present invention provides in a beverage brewing apparatus for preparing a beverage from an aqueous medium and a particulate beverage material with an automatic brewing cycle comprising delivering particulate beverage material and aqueous medium to a brew vessel and withdrawing beverage from said brew vessel to a dispensing station, said apparatus comprising particulate beverage material storage means, particulate beverage material delivery means for delivering particulate beverage material from said storage means to said brew vessel, aqueous medium delivery means for delivering aqueous medium to said brew vessel, beverage withdrawal means for withdrawing beverage from said brew vessel and delivering beverage to a beverage dispensing station and control means for controlling said particulate beverage material delivery means, said aqueous medium delivery means and said beverage withdrawal means, the control means being configured to induce (i.e. to operate the apparatus so as to provide) said automatic brewing cycle which includes the delivery of particulate beverage material from the particulate beverage material storage means to the brew vessel, the improvement wherein said control means is able (i.e. configured so as) to provide a semi-automatic brewing cycle wherein the particulate beverage material delivery means is inactive (i.e. does not participate in the brewing cycle) and said semi-automatic brewing cycle comprises delivering aqueous medium to said brew vessel and withdrawing beverage from said brew vessel to said dispensing station and said apparatus further comprises selection means in communication with said control means for allowing a user to select between said automatic brewing cycle and said semi-automatic brewing cycle, manual particulate beverage material introduction means, separate from said particulate beverage material delivery means, for a user to manually introduce particulate beverage material into said brew vessel for said semi-automatic brewing cycle and brew cycle initiation means in communication with said control means for initiating said semi-automatic brewing cycle.

In accordance with the present invention the apparatus maybe configured to reset to automatic mode after a semi-automatic brewing operation; alternatively the apparatus may have control means which stays in semi-automatic mode unless otherwise instructed by a user (e.g. pushing an appropriate mode initiation button/switch). In either case the apparatus may of course comprise selection means in communication with said control means for allowing a user to select between said automatic brewing cycle and said semi-automatic brewing cycle, e.g. to have the machine be instructed to proceed with the semi-automatic mode.

As may be appreciated in accordance with the present invention the control means is associated with mode change means (i.e. the selection means) for selectively placing said particulate beverage material delivery means in a stand-by mode wherein the particulate beverage material delivery means is inactive for the semi-automatic brewing cycle.

The word "automatic" as used herein means that once the brew cycle (whether automatic or semi-automatic) is engaged or initiated by a user then beverage brewing proceeds with no further intervention from the user to provide the brewed beverage.

In accordance with the present invention the particulate beverage material may, for example, be selected from the group consisting of coffee and tea.

In accordance with the present invention the brew vessel may be disposed in a housing and the manual particulate beverage material introduction means may comprise a housing lid for providing access through the housing to the brew vessel (and if desired or necessary, chute guide means), for the introduction of the particulate beverage material into said brew vessel. Alternatively, the particulate beverage material introduction means may comprise only an opening (e.g. in the absence of a housing enclosing the brew vessel or chamber) in the brew vessel (e.g. an upper or top opening as described herein).

In accordance with the present invention the apparatus may have a brew vessel which may have a floor, at least a portion of which, is configured as a filter for the evacuation of beverage from the vessel and being permeable to air; additionally the apparatus may have a fluid displacement means for forcing air into the brew vessel through the floor and for withdrawing obtained beverage. from the brew vessel through the floor.

Thus an apparatus of the present invention for preparing a beverage from an aqueous medium and a particulate beverage material may have a brew vessel having a floor, the floor being configured as a filter for the evacuation of beverage from said brew vessel and being permeable to air, supply means for supplying aqueous medium and particulate beverage material to said vessel, fluid displacement means for forcing air into the brew vessel through said floor and for withdrawing obtained beverage from the brew vessel through said floor, control means to effect a brewing cycle, said brewing cycle comprising supplying aqueous medium (and, if fully automatic, particulate beverage material) to the brew vessel, forcing air through said floor to agitate a mixture of beverage material and aqueous medium in the brew vessel and drawing the obtained beverage from the vessel through said floor, and a dispensing station for dispensing the obtained beverage.

The invention in particular may be used with piston type coffee brewing machines such as disclosed for example in U.S. Pat. No. 3,565,641. Such piston type coffee brewing machines are constructed for brewing a beverage from water (e.g. hot water) and ground beverage material in a brew vessel wherein at least a portion of the floor of the brew vessel is permeable to gas (e.g. air) and liquid and impermeable to the (spent) ground beverage material. An apparatus of this type may have any suitable (known) control means so as to be able to be operated so as to supply a predetermined amount of particulate beverage material and (hot) water to the brew vessel, thereafter forcing air through the gas/liquid permeable floor into the vessel to agitate the mixture and finally withdrawing the brewed beverage through the floor of the brew vessel and delivering it to a dispensing station i.e. a station at which may be placed a cup to receive the brewed beverage.

Alternatively, the present invention may of course be used with any other (known) types of brewing machines which exploit a brew vessel and a (fully) automatic brew cycle.

Referring to the drawings which illustrate example embodiments of the present invention.

Figure 1:
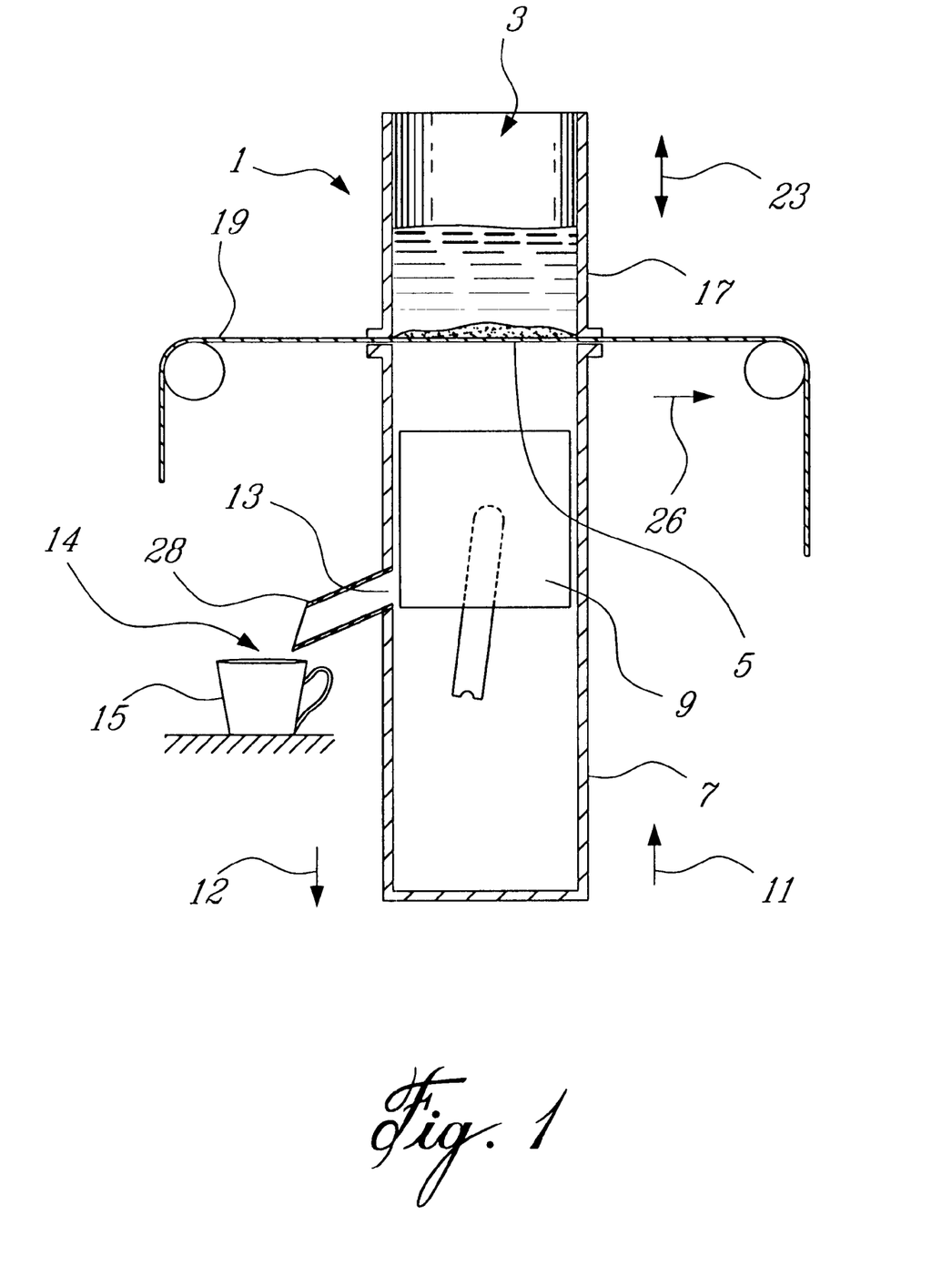
FIG. 1 is a schematic cross sectional view of a brew vessel and beverage dispensing mechanism for a piston type coffee brewer such as illustrated in U.S. Pat. No. 3,565,641.

FIG. 1 is a schematic cross-sectional view of a brew vessel and beverage dispensing unit or mechanism for a piston type coffee brewer such as illustrated in U.S. Pat. No. 3,565,641. A more detailed description of the construction of such brew vessel and beverage withdrawing means may be a gleaned from U.S. Pat. No. 3,365,641.

However, referring to FIG. 1 the coffee brewing components include a brew vessel 1, preferably having a top opening 3 to the atmosphere i.e. the coffee brew vessel has an upper or top opening 3 which may be used to introduce particulate beverage material and water into the interior of the brew vessel 1. The brew vessel 1 is provided with a filter floor 5 which is permeable to liquid and air but impermeable to the coffee grounds and separates the brew vessel from a second beverage vessel 7 thereunder. A piston 9 is disposed in the second vessel 7. The piston 9 is movable in the second vessel upwardly and downwardly (in the directions of the arrows 11 and 12) as the case may be for either inducing air agitation of the brewing mixture or for inducing a low pressure in the second vessel 7 for withdrawing the beverage through the filter floor 5 of the top brew vessel 1. An outlet 13 is provided in the sidewall of the second vessel 7 which cooperates with the piston 9 for dispensing the extracted beverage from the second vessel 7 to a dispensing station i.e. a station 14 wherein a cup 15 or other type of container may be placed in order to receive the brewed beverage.

As described in U.S. Pat. No. 3,565,641 the upper brew vessel 1 comprises the above-mentioned filter floor 5 and a cylindrical side wall 17. The filter floor 5 may for example comprise a portion of a continuous strip of filter paper 19 supported on a porous filter support; it may alternatively comprise a micromesh screen or other type of materials suitable for filtering the beverage being brewed and separating it from the used grounds.

As mentioned above, the upper brew vessel 1 is defined by the filter floor 5 and the cylinder side wall 17. The cylinder side wall 17 itself is movable upwardly and downwardly in the direction of the double headed arrow 23 and the apparatus is so configured so that the cylinder side wall 17 may be clamped in more or less fluid tight fashion against the filter structure which defines the filter floor 5 (i.e. for brewing). This characteristic of the (known) piston type brewer allows the upper cylinder side wall 17 to be raised above the filter floor 5 so as to facilitate the removal of any filter paper and grounds deposited thereon and the provision of fresh filter paper for a new brew cycle. The paper or filter is moved off in the direction of arrow 26 and the grounds and filter paper deposited in a suitable container. As may be seen fresh filter material is unrolled from a roll of such filter material. U.S. Pat. No. 3,565,641 may be consulted for more specific details.

As may be surmised from the above, when the piston 9 moves in the direction of the arrow 11 it will cause air above the piston 9 but below the filter floor 5 to pass through the filter floor 5 for air agitation of the brewing mixture. On the other hand when the piston 9 is moved in the opposite direction, namely in the direction of the arrow 12, the piston 9 creates a low pressure zone in the second vessel 7 which induces the brewed liquid or beverage to pass through the filter floor 5 (i.e. to be filtered through the filter floor) into the second or lower vessel 7 and as the piston 9 passes by the opening 13 in the side wall of the second vessel 7, the brewed beverage is allowed to flow out of the spout 28 to a dispensing station (i.e. into a container such as a cup 15).

Figure 2:
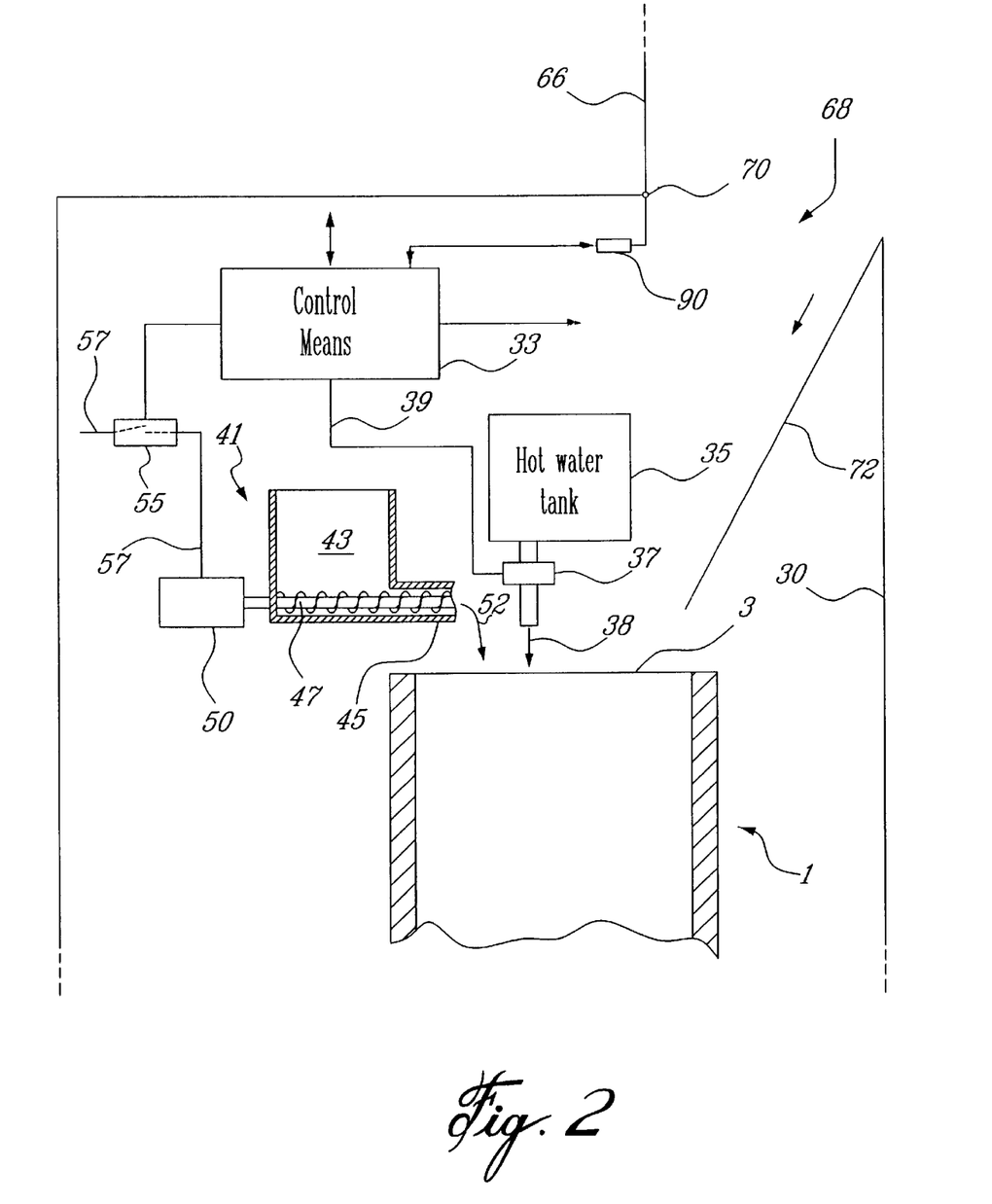
FIG. 2 illustrates in schematic and block format an example embodiment of a brewing apparatus in accordance with the present invention.

Turning to FIG. 2, this figure illustrates in schematic and block format an example embodiment of a brewing apparatus in accordance with the present invention. For purposes of illustration only a portion of the upper brew vessel 1 is shown. The brew vessel 1 is disposed within a housing 30 (again only a portion of which is shown). For the purposes of this example, other elements of the brewing apparatus are also shown as being disposed within the housing 30. These other elements however may be disposed outside of the housing 30 containing the brew vessel provided that suitable access to the interior of the housing is provided for these elements so that they may carry-out their function, e.g. supply materials to the brew vessel.

As may be seen, the apparatus shown in FIG. 2 includes a control means 33. This control means 33 may take any suitable (known) form whatsoever, (e.g. it may take the form of a computer chip or other electronic device with functions to control the apparatus based on software (please also refer to FIG. 16)).

The brew unit includes a tank 35 for holding (hot) water or other suitable or desired aqueous medium). The tank 35 is provided with an outlet which is connected to a solenoid valve 37 for controlling the flow of water out of the water tank 35 into the brew vessel in the direction of the arrow 38. As may be seen the hot water solenoid valve 37 is controlled by the control means 33 via line 39.

The brewing unit as shown also includes a coffee grounds dispensing component 41 for dispensing measured amounts of ground coffee into the brew vessel (i.e. particulate beverage material delivery means). The coffee dispensing component 41 comprises a hopper 43 in which may be disposed ground coffee. The hopper 43 includes a cylindrical conduit 45 in which is disposed a conveyor screw 47 e.g an archimedes type screw. The screw 47 is suitably coupled at one end thereof to an electric motor 50. When the motor 50 is energized by the application of electrical current (through power line 57), the motor 50 will induce the conveyor screw 47 to turn such that the screw 47 will push the coffee out of the opening of the conduit into the brewed vessel in the direction of the arrow 52. The energization of the motor 50 is controlled by the control means 33 i.e. by the opening and closing of a (known) power switch/relay 55; for illustration purposes the power switch/relay 55 is shown separate from the control means 33 in FIG. 2 and as being connected to an electric power line 57 for delivering electrical power or energy to the motor 50 to induce rotation of the motor shaft and in turn the coupled conveyor screw. The control means 33 is configured in any suitable manner (e.g. by exploiting appropriate electronics and associated software) so as to be able to place the motor 50 in inactive mode for a semi-automatic brew cycle or in active mode (i.e. to be energisable) for participating in a (fully) automatic brew cycle.

The brewing apparatus thus includes a mode change means (or component) in communication with the control means for selectively placing the motor (i.e. the particulate beverage material delivery means) in a stand-by mode wherein the particulate beverage material delivery means is inactive for the semi-automatic brewing cycle.

Figure 3:
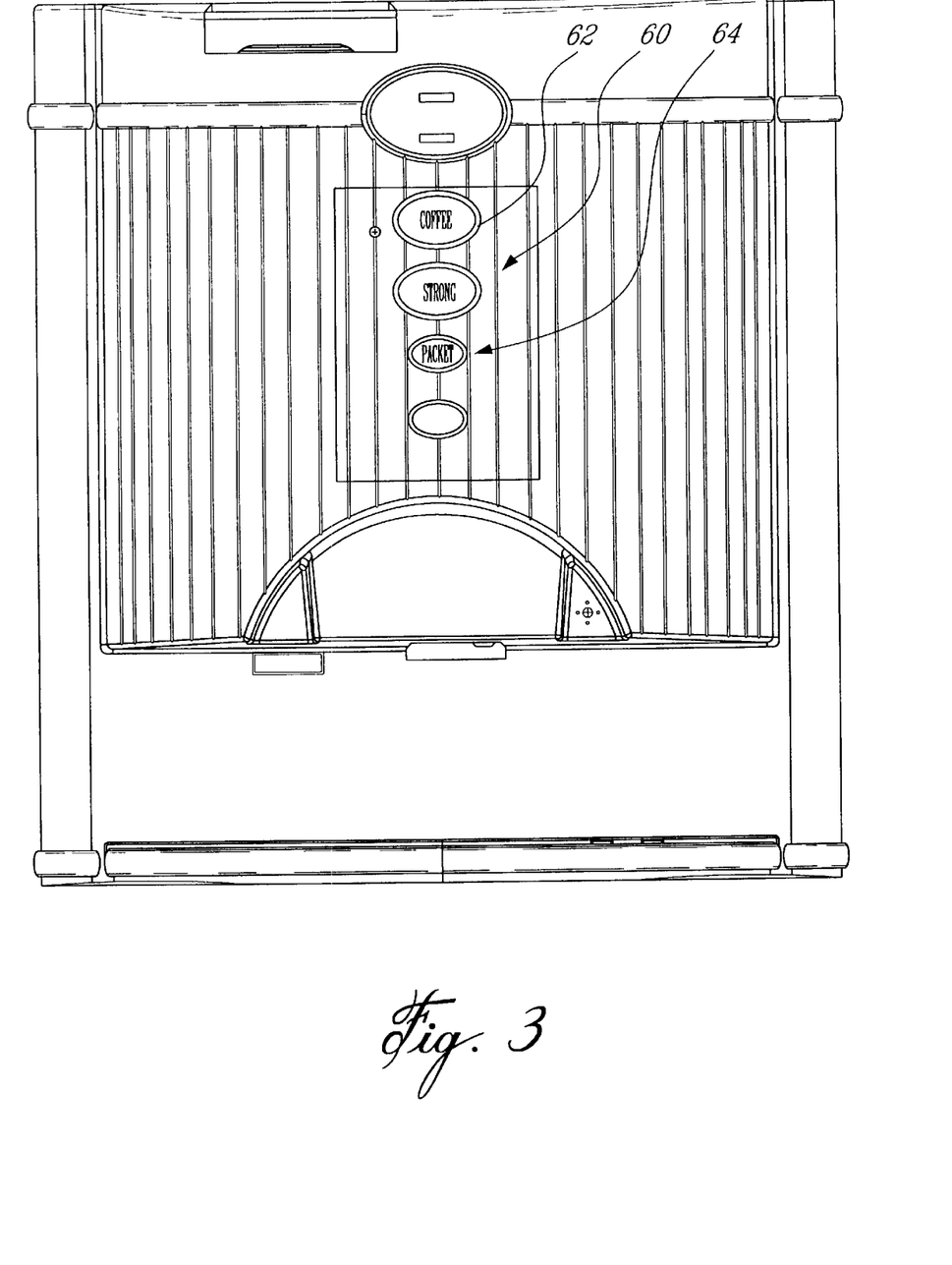
FIG. 3 illustrates a front view of an example outer housing of an apparatus in accordance with the present invention showing the control panel thereof.
Figure 16:
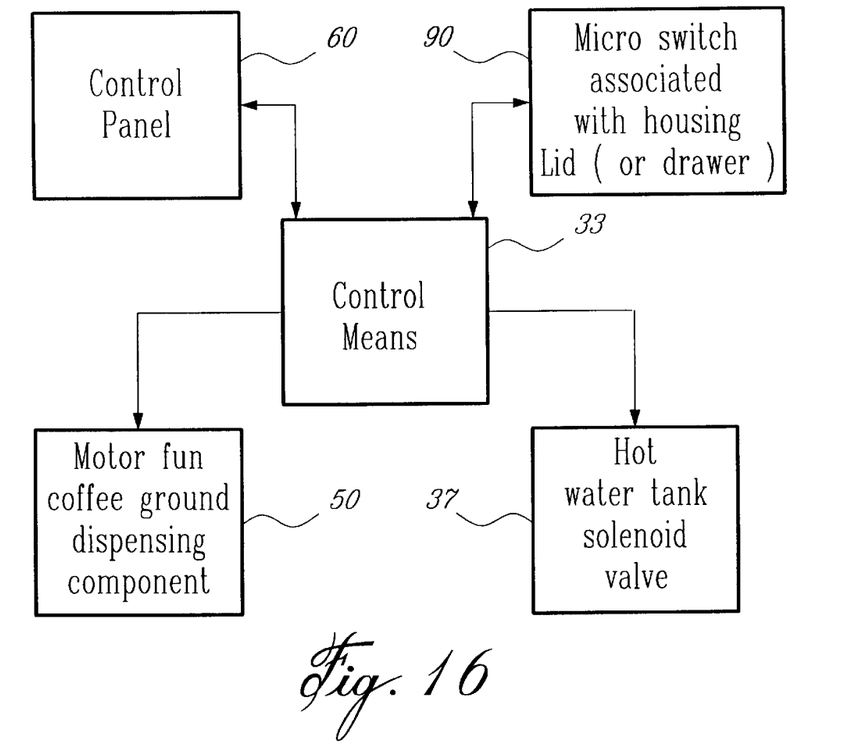
FIG. 16 is a schematic illustration in block form of a portion of an example electronic mechanism for operation of an apparatus of the present invention.

Referring to FIGS. 3 and 16, the brew apparatus is provided with a control panel (generally designated 60) which has mode selection means for allowing a user to select between a (fully) automatic and semi-automatic mode of operation. Referring to FIG. 3, this figure illustrates in schematic fashion a control panel for selecting various functions for the brewing machine. As may be seen the control panel 60 includes a control button (switch) 62 designated as coffee and a control button (switch) 64 designated as packet, each of which is in suitable communication with the control means 33 for selection of a respective mode of operation. The coffee button 62 communicates with the control means 33 so as to induce an automatic brew cycle. The packet button 64 on the other hand communicates with the control means 33 (in any suitable manner) so as to place the brewer in semi-automatic mode which allows the user to manually add a desired type of coffee to the brew vessel before the semi-automatic brew cycle is initiated as shall be explained below; the control means in semi-automatic mode will maintain the motor 50 in standby-by mode during brewing so that the motor 50 will not participate in the brewing cycle, i.e. the motor 50 will not be energised for semi-automatic operation.

Although the means for rendering the coffee dispenser into an inactive mode is illustrated by exploiting the ability of the control means 33 to deny energisation of the motor 50 during the brewing cycle, any other type of mechanism which can carry-out the same function may be used. For example, the motor 50 may be coupled to the conveyor screw 47 by means of a suitable clutch mechanism which allows the shaft of the motor 50 to be engaged (i.e. coupled) and disengaged (de-coupled) from the shaft of the conveyor screw 47. In this latter, case depressing the packet button 64 will induce the motor 50 to become disengaged or de-coupled from the conveyor screw 47 for the purpose of semi-automatic operation of the coffee brewing apparatus.

As mentioned above the brew vessel is disposed in a housing. The housing 30, as shown in FIG. 2, has a housing lid 66 which may be pivoted about pivot or hinge means 67 between an open and closed position (please see FIGS. 12 and 13 for more detail). When the housing lid is in opened position it is possible to gain access into the interior of the housing in order to introduce coffee manually into the brew vessel via the exposed housing opening 68. Thus, once the packet button 64 is depressed and the coffee grounds dispensing unit is placed in stand-by or inactive mode the housing lid 66 may be pivoted open so as to provide access to the opening 68 in the housing 30 through which coffee grounds may be introduced into the brew vessel. As shown in FIG. 2, the housing lid 66 is illustrated in its open configuration i.e. pivoted about its hinge end. With the housing lid in an open state coffee grounds may then be poured through the housing opening 68. The ground coffee will slide along the guide chute 72 provided in the interior of the housing so as to fall into the brew vessel through the top opening 3 of the brew vessel. As may be appreciated in this case the manual particulate beverage introduction means comprises the lid 66, the housing opening 68, the guide chute 72 and the top opening 3 of the brew vessel.

Figure 4:
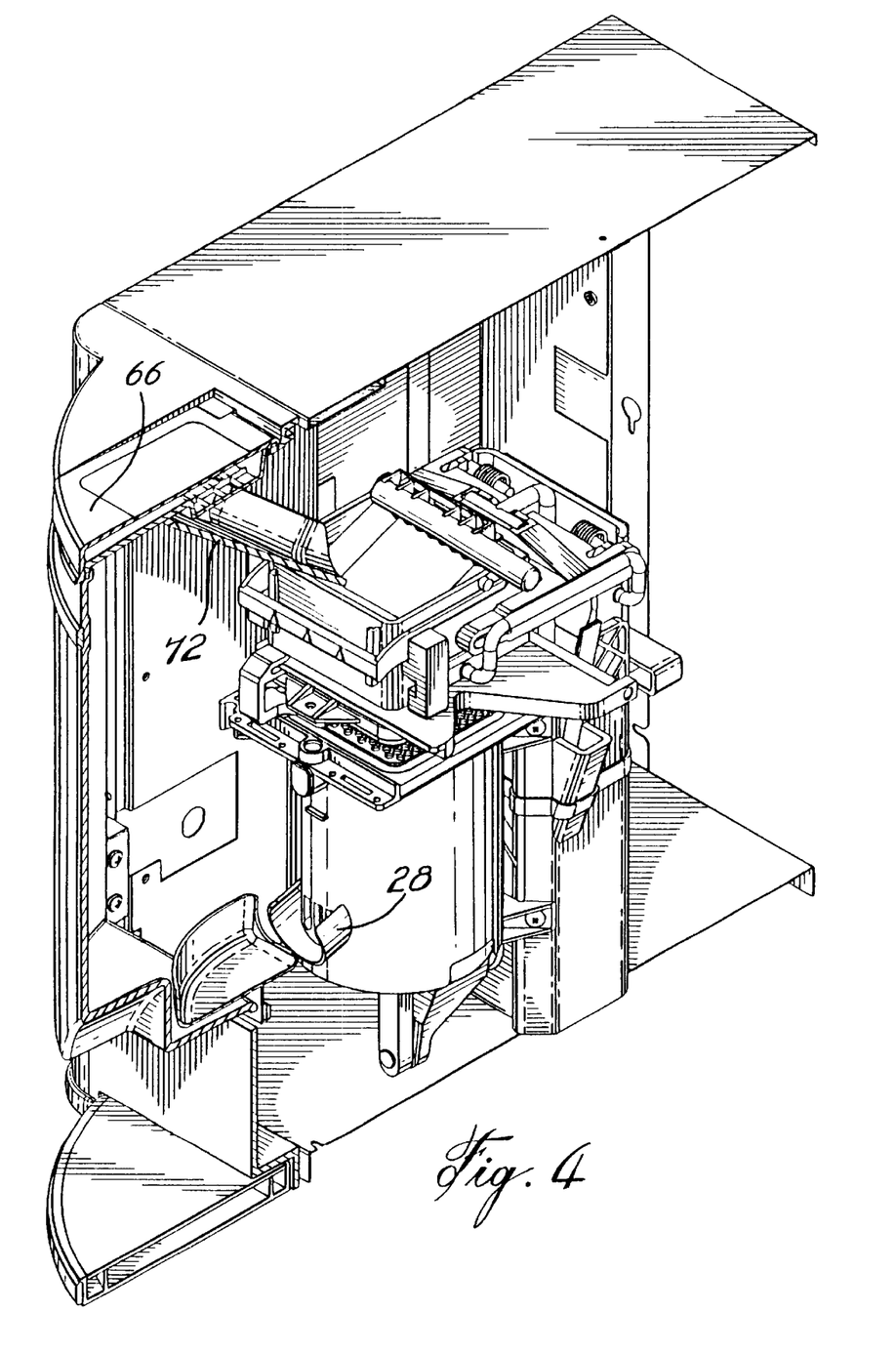
FIG. 4 illustrates the example housing shown in FIG. 3 provided with a housing lid, the housing being shown as being partially cut away so as to expose the piston type coffee brewing assembly housed therein and the housing lid being in a closed position.
Figure 5:
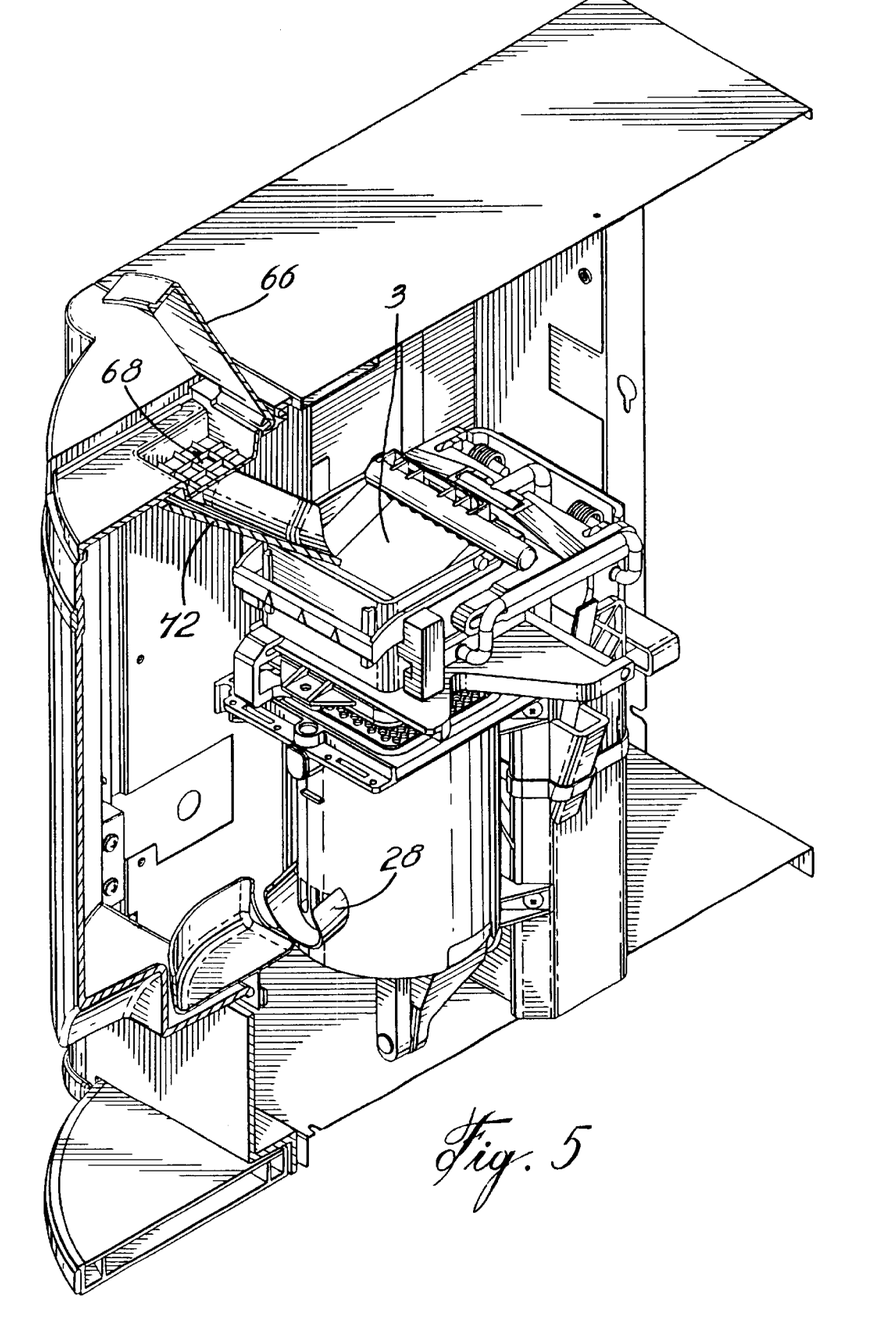
FIG. 5 illustrates an example housing shown in FIG. 4 provided with a housing lid, the housing being shown as being partially cut away so as to expose the piston type coffee brewing assembly housed therein and the housing lid being in a pivoted back position to expose an opening in the housing top wall.

FIGS. 4 and 5 illustrate in more detail an example housing provided with a housing lid 66. The housing 30 is shown as being cut away partially so as to expose the piston type coffee brewing assembly housed therein. As may be seen in FIG. 4, the lid 66 is in a closed position. Referring to FIG. 5, this figure illustrates the housing lid 66 being in a pivoted back position so as to expose the opening 68 through which coffee grounds may be poured and directed by the chute 72 to the opening 3 of the brew vessel.

FIGS. 6 to 11 illustrate an alternate mechanism by which to manually introduce the coffee grounds into the brew vessel. Refer to these figures and in particular FIGS. 10 and 11, the mechanism for introducing the coffee into the brew vessel comprises a slidable housing drawer or shelf 76 which has a pivotable interior container 78 which is hinged at one end thereof by hinge 80. Once coffee grounds are placed in the pivotable container 78 the drawer 76 may then be pushed back into the machine in the direction of the arrow 82. As the drawer or shelf 76 passes into the machine the interior container 78 pivots downwardly about the pivot axis of hinge 80 in the direction of the arrow 84 so as to allow the coffee grounds to flow out of the open end 86 thereof onto and along the guide chute 72 and hence into the brew vessel through the top opening 3 of the brew vessel.

Figure 12:
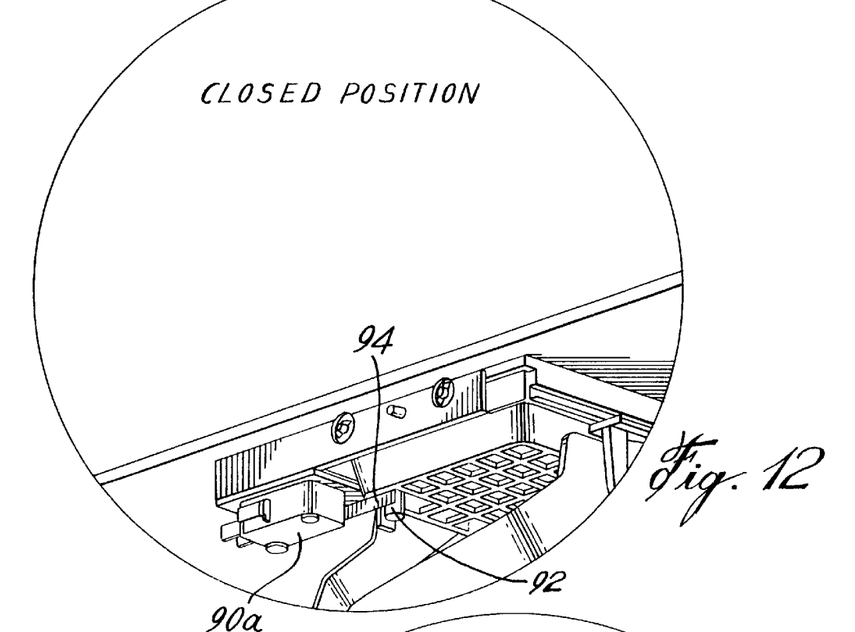
FIG. 12 is an enlarged schematic partial sectional view of showing the housing lid shown in FIG. 4 in closed position as well as an associated micro switch.
Figure 13:
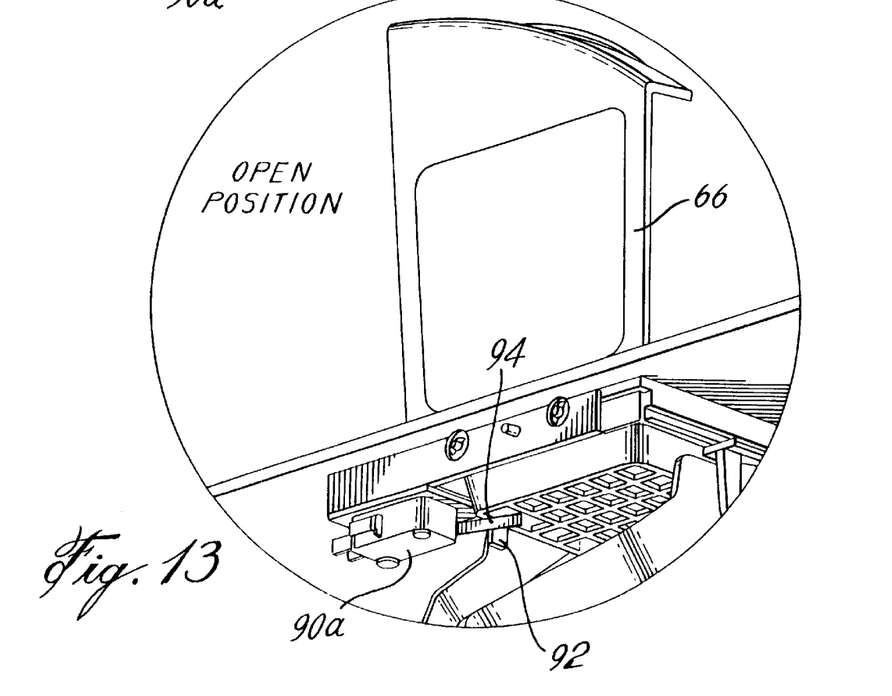
FIG. 13 is an enlarged schematic partial sectional view of showing the housing lid shown in FIG. 5 in closed position as well as an associated micro switch.

Referring back to the FIG. 2 the brewing unit includes a sensor switching mechanism 90 (e.g. a micro-switch) associated with the housing lid 66 for providing signals (open switch or closed switch) to the control means 33 indicative that the coffee grounds are in the brew vessel (lid in the pivoted up position) and to initiate the semi-automatic brew cycle (lid subsequently in the down closed position). FIGS. 12 and 13 illustrate an example micro switch 90a associated with the housing lid, the housing lid 66 having a lever member or projection 92 for engaging a member 94 of the switch 90 so as to induce the switch 90a to be in open or closed configuration as the lid 66 itself is in closed or open position (the switch may be of the type wherein pressure on the member 94 in one direction and release of pressure in the opposite direction will bring about a change in configuration of the switch).

Figure 14:
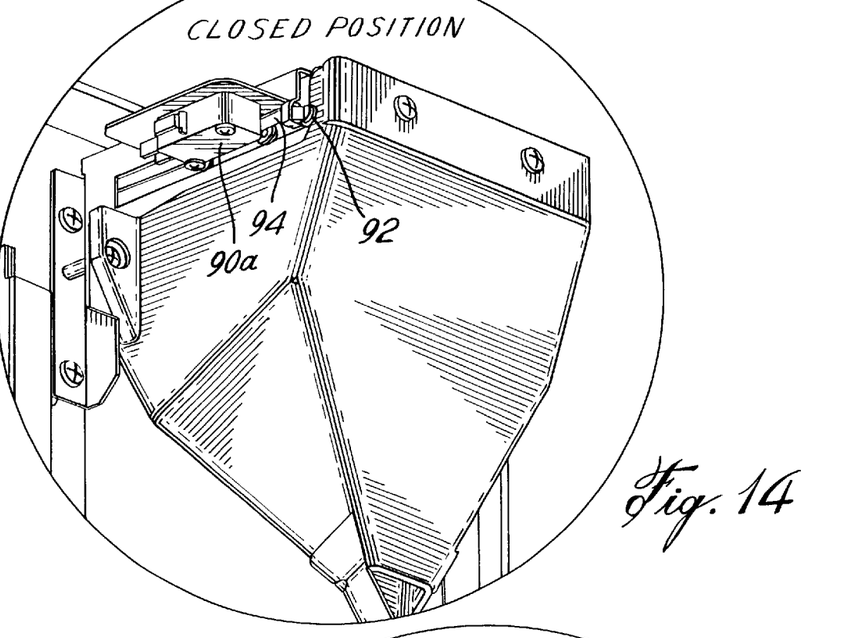
FIG. 14 is an enlarged schematic partial sectional view of showing the housing drawer shown in FIG. 7 in closed position as well as an associated micro switch.
Figure 15:
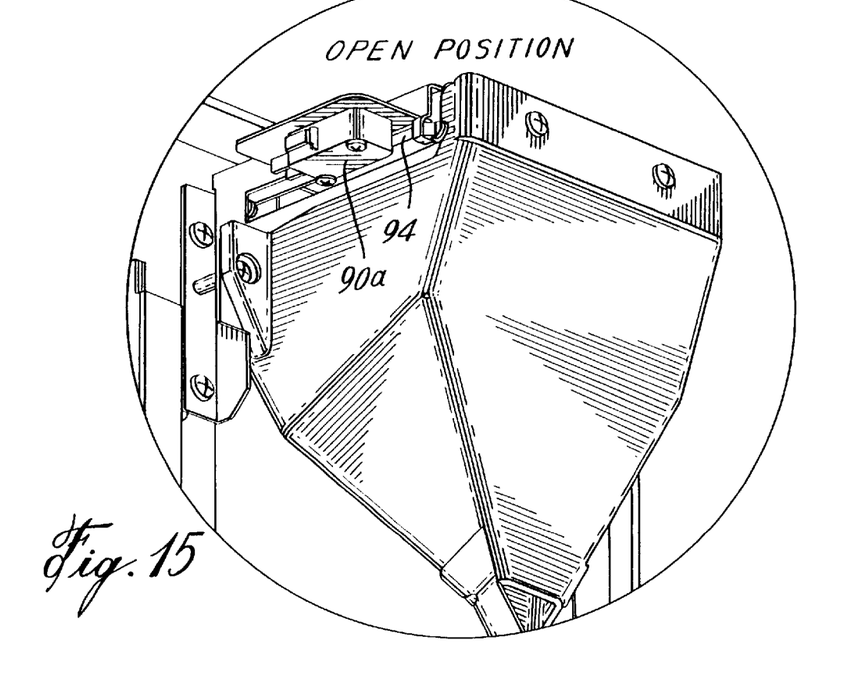
FIG. 15 is an enlarged schematic partial sectional view of showing the housing drawer shown in FIG. 8 in open position as well as an associated micro switch.

FIGS. 14 and 15 illustrate an analogous example of a micro-switch 92 and housing drawer 76 combination (i.e. for the drawer shown in FIGS. 6 to 11). These FIGS. 11 and 12 the mechanism for introducing the coffee grounds into the brew vessel is of the drawer type structure open at the distal end thereof away from the front face of the machine. The housing drawer has a member or projection for engaging a suitable member of the switch so as to induce the switch to be in open or closed configuration as the drawer itself is in closed or open position.

The control means 33 may advantageously be configured (in any known manner) such that on termination of the semi-automatic brew cycle, the control means resets to automatic mode, i.e. if semi-automatic operation is again desired in this case it will be necessary to again press on the packet button. Alternatively, if the control means is configured to stay in semi-automatic mode, it may of course be configured such that pressing the coffee button will change the system to automatic mode with the (fully) automatic brew cycle proceeding on pressing of the coffee button. In either case the selection means is in communication with said control means for allowing a user to select between said automatic brewing cycle and said semi-automatic brewing cycle.

Figure 6:
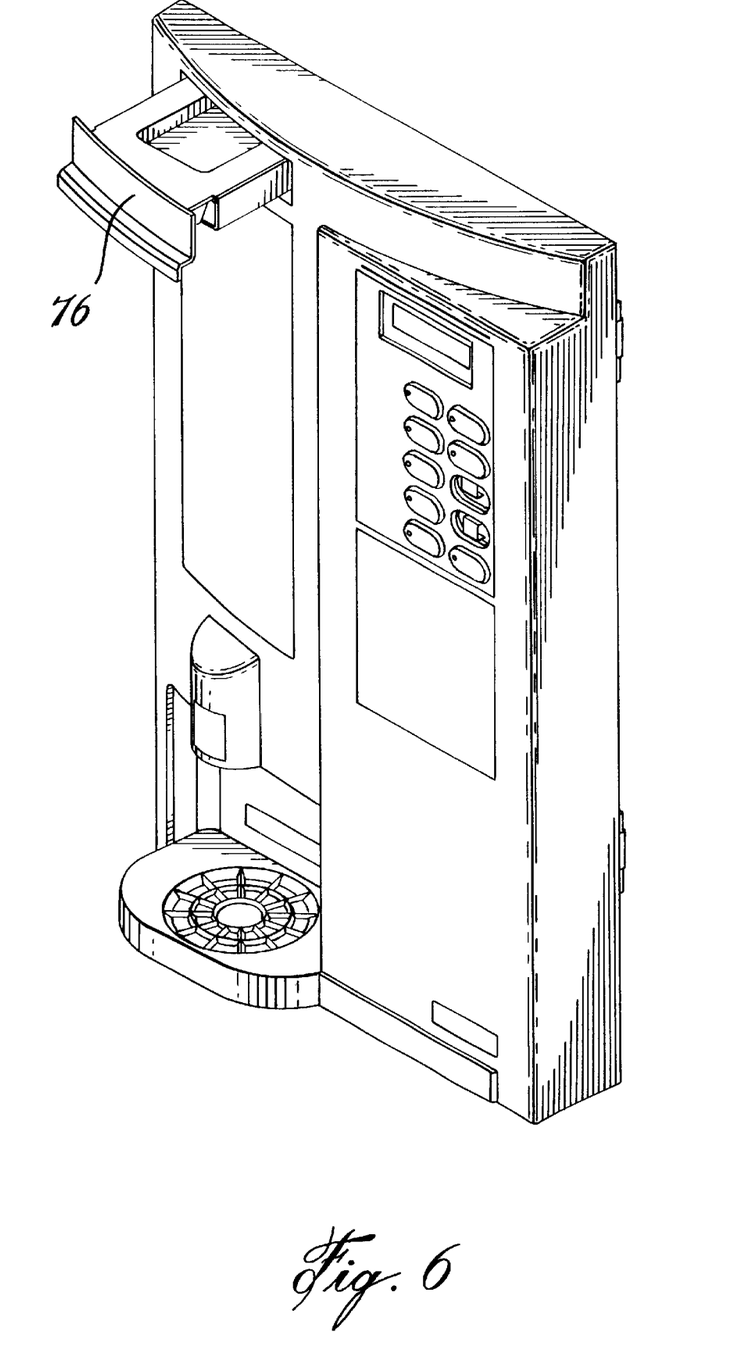
FIG. 6 illustrates a front perspective view of another example front face of an outer housing of an apparatus in accordance with the present invention showing a drawer component for the manual introduction of coffee into the brew vessel (FIG. 6 being on the same page of drawings as FIGS. 9 to 11)
Figure 7:
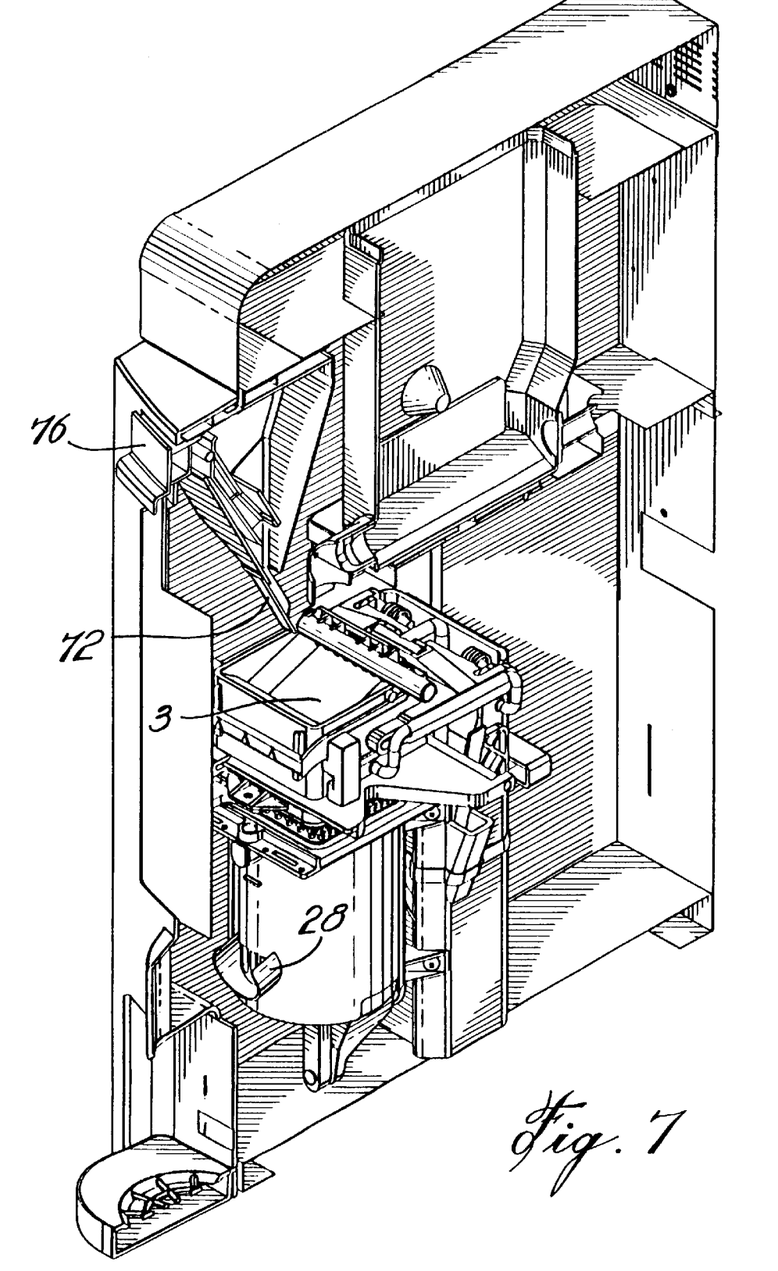
FIG. 7 illustrates the example housing shown in FIG. 6 provided with a housing drawer, the housing being shown as being partially cut away so as to expose the piston type coffee brewing assembly housed therein and the housing drawer being in a closed position.
Figure 8:
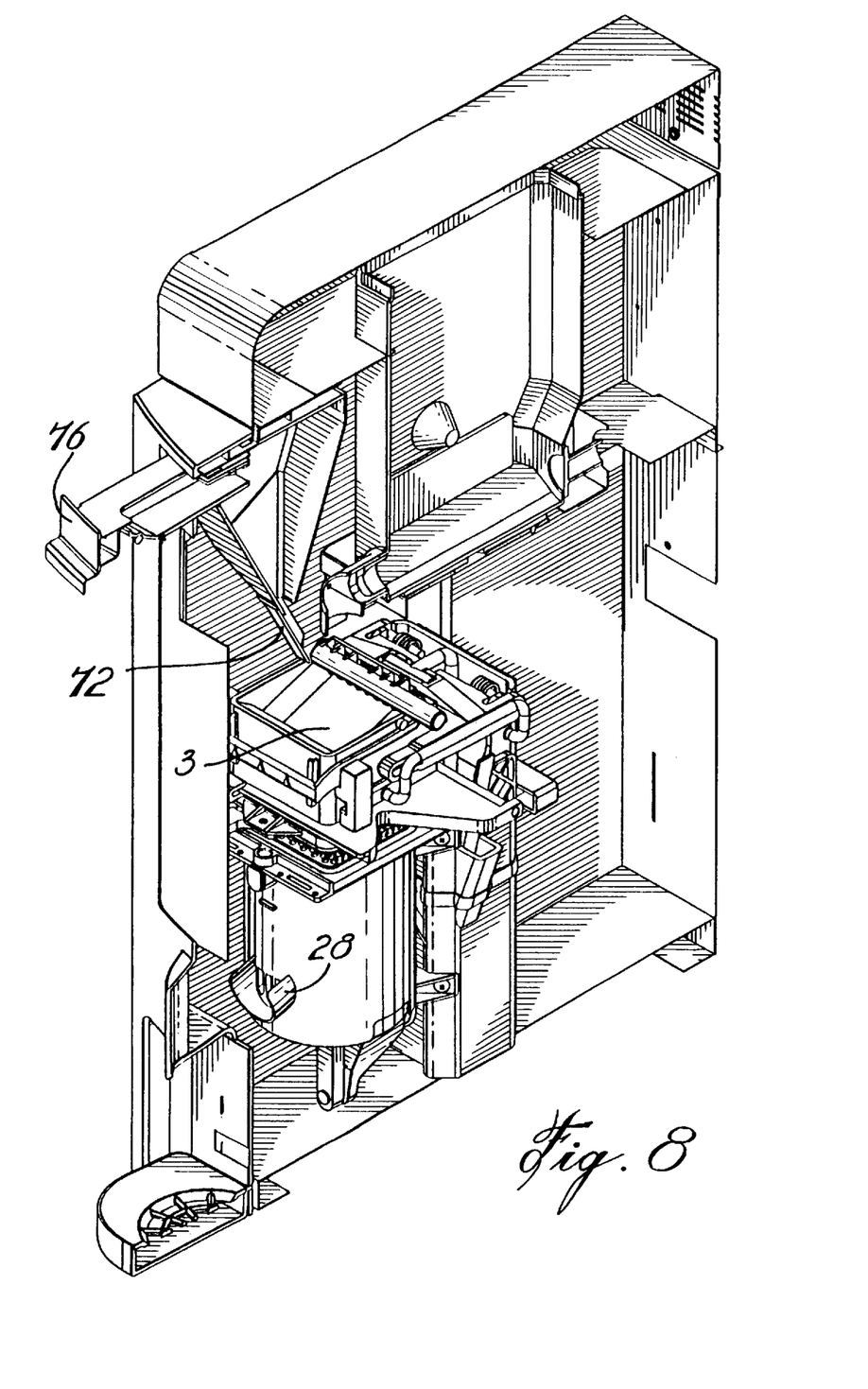
FIG. 8 illustrates the example housing shown in FIG. 6 provided with a housing drawer, the housing being shown as being partially cut away so as to expose the piston type coffee brewing assembly housed therein and the housing drawer being in an opened position.
Figure 9:
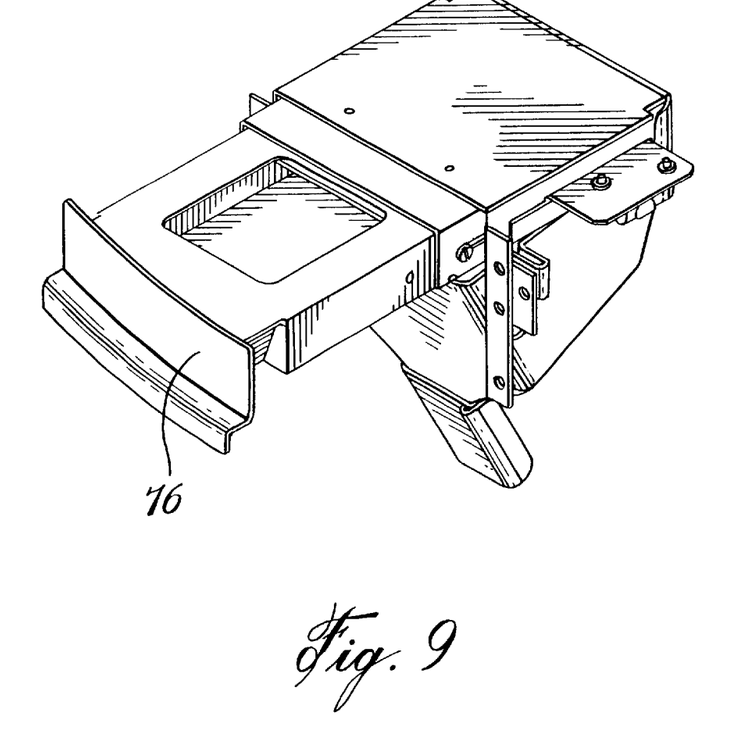
FIG. 9 illustrates a perspective side view of the drawer assembly shown in FIGS. 7 and 8, the drawer being in a opened position ready to receive coffee grounds.
Figure 10:
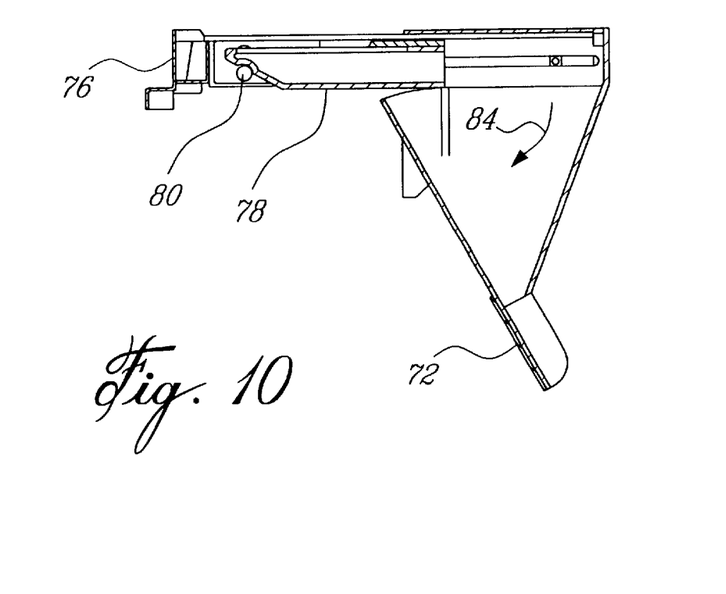
FIG. 10 is a sectional side view of the drawer assembly shown in FIG. 9.
Figure 11:
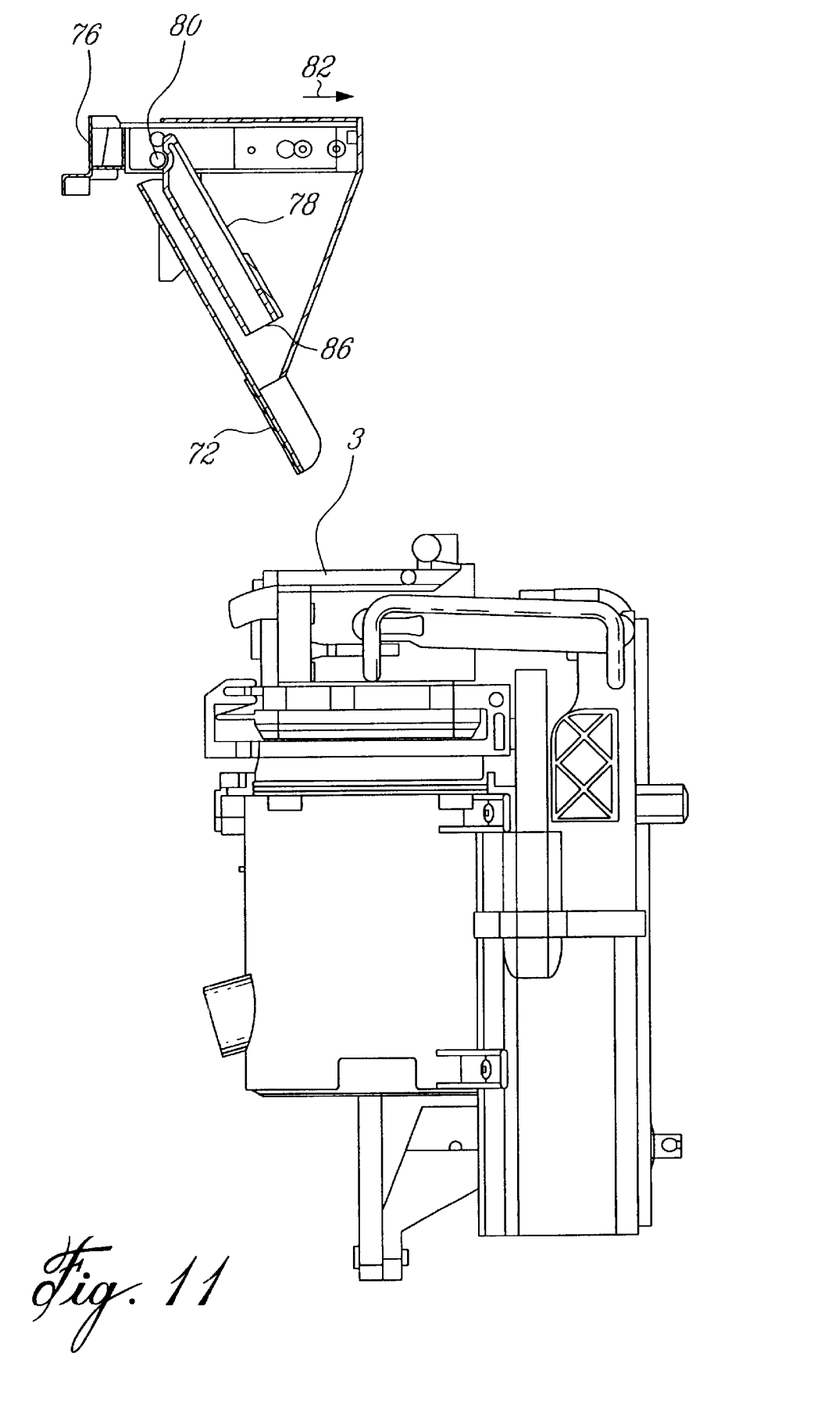
FIG. 11 is a sectional side view of the drawer assembly shown in FIG. 9 with the drawer in closed position with a guide chute over the brew vessel of a piston type brewing unit.
Figure 17:
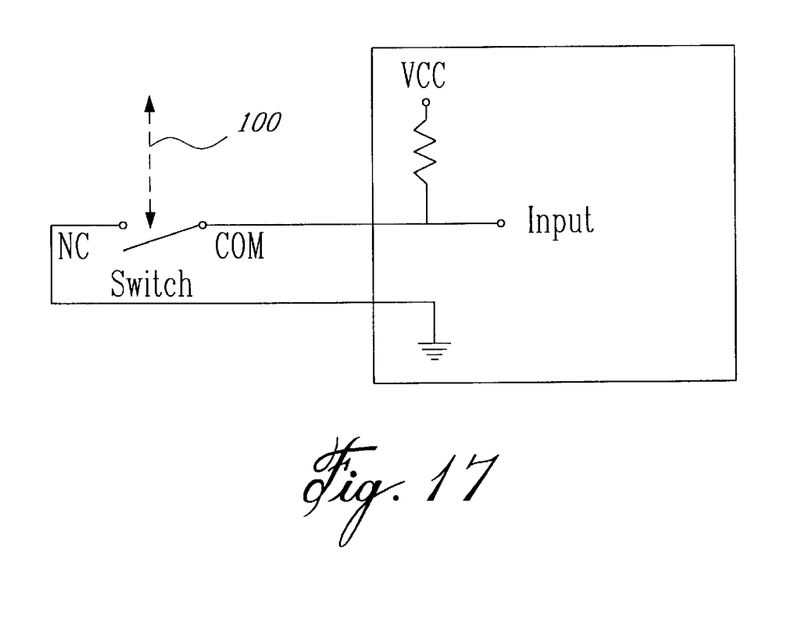
FIG. 17 illustrates a partial electronic circuit associated with the controller means and which shows the micro switch discussed with respect to FIGS. 2, 4 and 6.

Referring to FIG. 17 this figure shows a partial electronic circuit associated with the controller means and which shows the micro switch 90 (or 90a) discussed with respect to FIGS. 2,4 and 6. The switch may be for example a micro-switch having a momentary contact trigger button and a lever arm contacting the button. The switch may be opened or closed by appropriate movement of the lid (or drawer) projection member (shown for illustration purposes as being) in the direction(s) of the double headed arrow 100. When the lid (or drawer) is open the switch is not activated; the circuit contact is closed (input=low level). On the other hand when the lid (or drawer) is closed the switch is activated; the circuit contact is open (input=high level). The micro-switch may for example be obtained from C&K Components Inc. (e.g. model 24TMA15-4 or 34TMT28-4).

We claim:

1. In a beverage brewing apparatus for preparing a beverage from an aqueous medium and a particulate beverage material with an automatic brewing cycle comprising delivering particulate beverage material and aqueous medium to a brew vessel and withdrawing beverage from said brew vessel to a dispensing station, said apparatus comprising particulate beverage material storage means, particulate beverage material delivery means for delivering particulate beverage material from said storage means to said brew vessel, aqueous medium delivery means for delivering aqueous medium to said brew vessel, beverage withdrawal means for withdrawing beverage from said brew vessel and delivering beverage to a beverage dispensing station and control means for controlling said particulate beverage material delivery means, said aqueous medium delivery means and said beverage withdrawal means, the control means being configured to induce said automatic brewing cycle which includes the delivery of particulate beverage material from the particulate beverage material storage means to the brew vessel, the improvement wherein said control means is able to provide a semi-automatic brewing cycle wherein the particulate beverage material delivery means is inactive and said semi-automatic brewing cycle comprises delivering aqueous medium to said brew vessel and withdrawing beverage from said brew vessel to said dispensing station, and said apparatus further comprises selection means in communication with said control means for allowing a user to select between said automatic brewing cycle and said semi-automatic brewing cycle, manual particulate beverage material introduction means, separate from said particulate beverage material delivery means, for a user to manually introduce particulate beverage material into said brew vessel for said semi-automatic brewing cycle, and brew cycle initiation means in communication with said control means for initiating said semi-automatic brewing cycle.

2. An apparatus as defined in claim 1 wherein said brew vessel is disposed in a housing and said manual particulate beverage material introduction means comprises a housing lid for providing access through the housing to the brew vessel for the introduction of the particulate beverage material into said brew vessel.

3. An apparatus as defined in claim 1 wherein said particulate beverage material is selected from the group consisting of coffee and tea.

4. An apparatus as defined in claim 2 wherein said particulate beverage material is selected from the group consisting of coffee and tea.

* * * * *